July 28, 1964  J. A. VIERLING  3,142,123
PERPETUAL CALENDAR
Filed Aug. 16, 1961  2 Sheets-Sheet 1
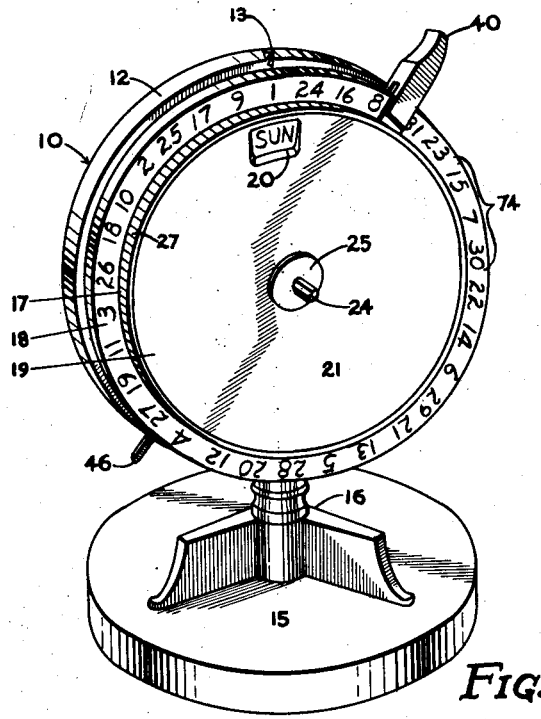
FIG. 1
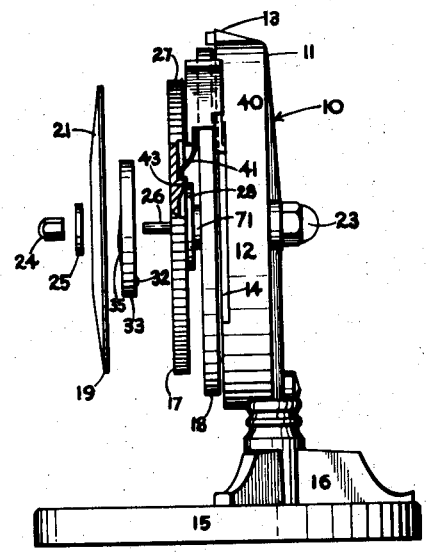
FIG. 3
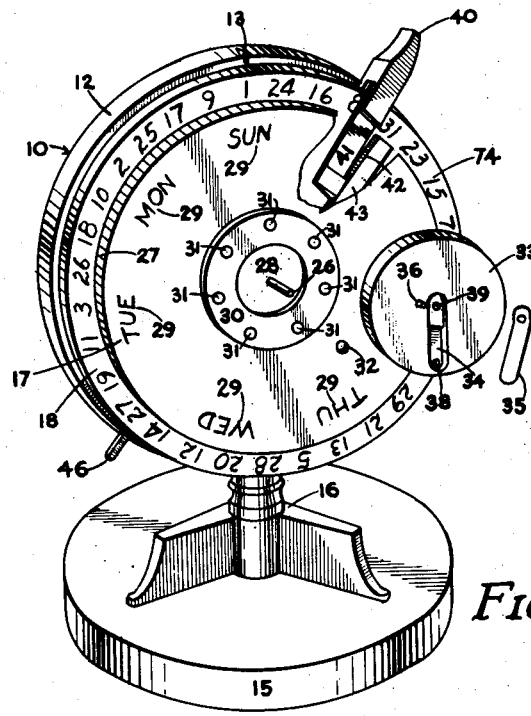
FIG. 2
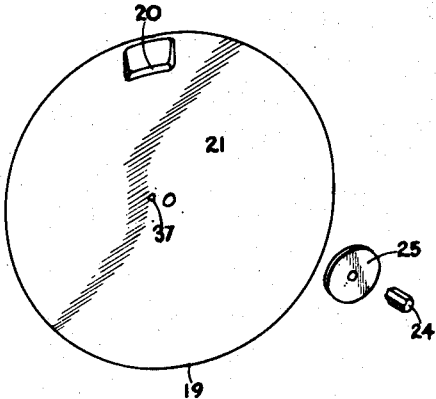
INVENTOR.
JOHN A. VIERLING
BY Robert W. Burns
ATTORNEY July 28, 1964  J. A. VIERLING  3,142,123
PERPETUAL CALENDAR Filed Aug. 16, 1961  2 Sheets-Sheet 2

INVENTOR.
JOHN A. VIERLING
BY Robert W. Burns
ATTORNEY

United States Patent Office 3,142,123
Patented July 28, 1964

3,142,123
PERPETUAL CALENDAR
John A. Vierling, St. Paul, Minn., assignor to Standard Packaging Corporation, New York, N.Y., a corporation of Virginia
Filed Aug. 16, 1961, Ser. No. 131,815
5 Claims. (Cl. 40—113)

This invention relates to a perpetual calendar that is attractive, accurate and simple to operate.

While there are many different varities of perpetual calendars presently on the market, the majority incorporate a conventional rectangular or cylindrical arrangement of indicia from which the viewer determines the correct date. All have a definite "sameness" or consistency in appearance and operation. Often a considerable amount of manipulation and calculation is necessary before the operator can determine the correct date. The instant device obviates these factors. The present calendar operates in a unique manner simulating the "Wheel of Fortune" gaming device, popular on river boats in the 1800's, yet quickly and accurately determines the correct date by simple lever actuation. A novel arrangement of actuating gears and a magnet provide exact determination of the correct day and date. Although accurate and simple in operation the device is designed to provide an attractive and efficient desk piece.

It is therefore an object of this invention to provide a perpetual calendar that is simple and accurate in its operation.

A further object of this invention is to provide a perpetual calendar which in operation simulates a "Wheel of Fortune," yet selects the correct day and date with consistent exactness.

A still further object of this invention is to provide a perpetual calendar incorporating a magnet and spring actuated gears for selecting the correct day and date by simple actuation.

Other and further objects of the invention are inherent and apparent in the apparatus as described, pictured, and claimed. To the accomplishment of these ends, this invention comprises the features hereinafter fully described in the specification and pointed out in the claims.

This invention will be described with reference to the figures of the drawings in which corresponding numerals correspond to the same parts and in which:

FIG. 1 is a front perspective view of the present invention;

FIG. 2 is a front perspective view partially exploded and partially broken away to show the day indicator assembly;

FIG. 3 is a side view of the device partially exploded and partially broken away;

Structure

Figure 4:
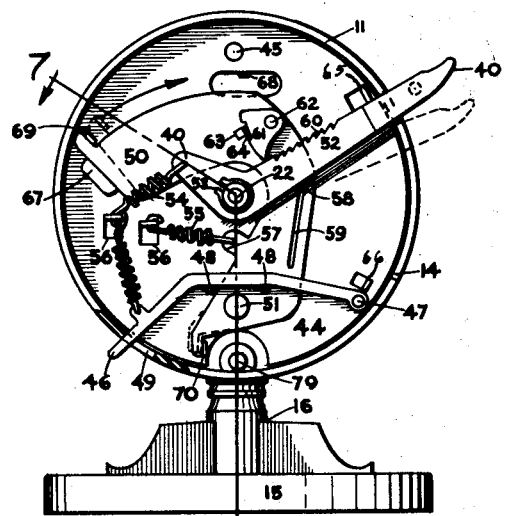
FIG. 4 is a front view of the actuating mechanism shown in "rest" position for actuating the date wheel.

With reference now to the drawings and particularly FIGS. 1 and 2 the calendar comprises in general a substantially hollow cylindrical case 10 having a back wall 11 and side walls 12. An indicator 13 is integrally formed at the top of wall 11 to assist the operator in locating the correct date indicia. One side of wall 11 has an elongated resected section 14 to provide movement of the calendar actuation means. Case 10 is supported on a base 15 which includes legs and stem 16 integrally moulded with the base. A day indicator disc 17 and date wheel 18 are coaxially and rotatably mounted on the front or open face of case 10. These provide the proper arrangement of indicia for determining the correct day and date. A decorative panel or disc 19 which may be faced with any suitable design covers the day indicator disc. This panel has an indicating frame 20 at the top so that only the correct day is in view at any one time. The case, base, date disc and date wheel may be made of any suitable material. In the present invention thermoplastic materials were found most suitable because of economy of manufacture. The decorative disc, however, is preferably made of light metal so that a design may be electroplated or stamped on its face 21.

Figure 7:
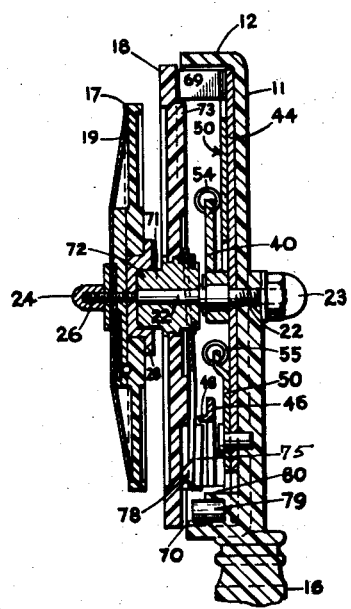
FIG. 7 is a sectional view taken along the lines 7—7 and in the directions of the arrows of FIG. 4 with the actuating means in the dotted line position of FIG. 4.

Referring primarily to FIGS. 2, 3 and 7 the day indicator disc 17 and date wheel 18 are mounted on a main shaft 22. The latter is fixed in stationary position at the center of rear wall 11 by acorn nut 23. Shaft 22 extends out from the case for mounting disc 17 and wheel 18 together with their corresponding assembly including decorative disc 19. This entire assembly is secured to the shaft by front acorn nut 24 and washer 25. By referring to FIG. 7, it is seen that the distal end 26 of shaft 22 is of reduced diameter. Although not shown in the drawings the cross section of end 26 represents a square.

The periphery of disc 17 has a knurled surface 27 so that it can be easily grasped for manual manipulation to provide proper setting of the day indicia. Secured to the center of disc 17 is flanged bearing 28 which mounts the disc for rotation over the squared distal end 28 of the shaft. Day indicia 29 on the disc 17 represent the seven days of the week and are consecutively dispersed at spaced intervals adjacent the periphery of disc 17. A raised annulus 30 is disposed at the center of the disc and contains a number of concentrically arranged circular recesses 31. Each recess is positioned in radial alignment with one of the day indicia 29.

In order to position disc 17 so that the day indicia are in registry with indicating frame 20 a steel pellet 32 is resiliently positioned in one of the recesses 31. The pellet is held in position by circular retainer 33 which has a detent well 34 over which is disposed a detent spring 35 which resiliently presses against pellet 32, best shown in FIGS. 2 and 3. Circular retainer 33 also has a projecting lug 36 which projects through a small aperture 37 adjacent the center of panel 19 to prevent any rotation of the panel.

The inward surface of pellet 32 projects through a pellet aperture 38 which seats the pellet at the lower end of retainer 33. The projected area of the pellet fits in a selected one of recesses 31 when the latter is rotated into position directly behind the pellet. Retainer 33 is mounted on the squared distal end 26 of shaft 22 by means of a squared aperture 39. Since aperture 39 is squared, retainer 33 is prevented from rotating on the shaft. It is thus seen that pellet 32 is always held in a stationary position. As the operator manually rotates disc 17 to select the appearance of the correct day in frame 20, pellet 32 will be forced into one of the recesses 31. The pellet thus acts as a transitory stop against further rotation until it is desired to select successive day indicia. Since the recessed areas are in radial alignment with day indicia 29, disc 17 will always be stopped from rotation by the pellet 32 so that any one of the seven indicia appear in frame 20. Pellet 32 is thus positioned in vertical alignment below frame 20 so that its contact with recesses 31 will always stop disc 17 when one of the indicia 29 is in registry with frame 20.

Once set for the correct day, disc 17 is rotated to indicate successive days by actuation of bipartite lever 40. Referring to FIGS. 2 and 3 lever 40 has an outer arm 41 extending immediately behind disc 17 and consisting of a thin resilient metal. The distal end of arm 41 is formed in the configuration of a square with the lower edge angled outward, best shown in FIG. 2. The position of this edge allows it to contact the upper marginal surface 42 of any one of a series of blades or rotors 43 suitably formed with or attached to the rear surface of disc 17. Rotors 43 extend radially out to the periphery of disc 17 and in cross section substantially represent a right triangle, one of the legs of the triangle forming the upper surface 42. The rotors are positioned on the back of the disc so that the outer end of each is in registry directly behind one of the seven day indicia 29 on the front of disc 17. Thus the outer ends of rotors 43 are spaced apart from each other exactly the same distance as are indicia 29 and also substantially the same distance that lever 40 travels within section 14 upon its actuation.

When lever 40 is pushed down by the operator the distal end of arm 41 contacts the surface 42 of one of the rotors to rotate disc 17 a distance equivalent to the distance between indicia 29. Thus the next successive day will appear in frame 20. As explained above the pellet 32 is movably seated in any one of recesses 31 the latter also being in radial alignment with indicia 29. Thus pellet 32 will fit into the next one of the recesses which is rotated into alignment below frame 20 so that a successive indicia 29 will appear in registry with the frame. Pellet 32 thus is used as a means to "set" disc 17 after rotation and insure that successive indicia will always be in registry with frame 20.

When the return mechanism brings lever 40 back to the "rest" position of FIGS. 1 and 4 the upper edge of the distal end of arm 41 passes behind the rotor 43 adjacent the one previously actuated. Arm 41 being resilient and the upper edge of its distal end being angled inwardly allows it to depress and pass by contact behind rotor 43 without rotating disc 17. The triangular cross sectional shape of the rotors also assist in the passage as can best be visualized from FIG. 3. Upon return of lever 40 to the "rest" position, the lower edge of arm 41 is again in position over surface 42 of the adjacent rotor 43 to again actuate the day disc.

Figure 5:
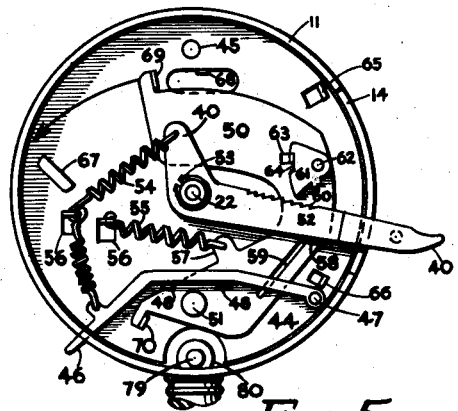
FIG. 5 is a front view of the actuating mechanism in position to actuate the date wheel.

Referring now to actuation of date wheel 18, FIGS. 4 and 5 show a mounting plate 44 secured to the inner face of wall 11 by means of mounting stud 45. A reset lever 46 to set wheel 18 to the correct date is pivotally mounted to the lower part of plate 44 by a reset pivot 47. The reset lever 46 has two spaced reset lugs 48 which extend out from the forward surface of the lever. Lever 46 extends out through side wall 11 by means of reset aperture 49 so that the lever may be manually actuated. Upon actuation lever 46 moves downward so that lugs 48 secure counterweight means on the rear surface of wheel 18 (explained below) while the operator manually rotates the wheel until the correct date appears under indicator 13.

Figure 6:
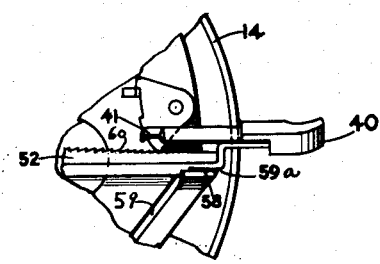
FIG. 6 is a fragmentary view of the position of a section of the date wheel actuating means just prior to actuation.

To actuate wheel 18 an arcuate spring actuated rocker member 50 is pivotally mounted to plate 44 by rocker member pivot 51. Member 50 is substantially in the shape of a semi-circle and is given partial rotation by inner arm 52 of lever 40, the former disposed in spaced relation from arm 41, best shown in FIG. 6. Lever 40 is mounted for movement along resected section 14 on shaft 22 and secured thereto by lever knurl 53 directly over plate 44. Coiled springs 54 and 55 having one end thereof secured to a pair of spring lugs 56 are connected at their opposite ends respectively to the pivotal end of lever 40 and grommet 57 on the lower portion of member 50. Springs 54 and 55 tend to hold lever 40 and member 50 in the position shown in FIG. 4. It is readily seen that any movement of the lever and arcuate member away from this position is against the tension of the resilient springs.

As lever 40 is pushed down by the operator the lower edge of inner arm 52 contacts an upstanding catch 58 integrally formed with member 50. Catch 58 is disposed adjacent an elongated slot 59 in member 50 providing an arm to give the catch a slight amount of resilient movement. The downward movement of arm 52 pushes on catch 58 to pivot member 50 in a clockwise direction (shown by the arrow in FIG. 4) and moves the member from the position shown in FIG. 4 to that shown in FIG. 5. Arm 52 contains a return recess 59a comprising an area of diminished thickness adjacent the bifurcation of lever 40. As catch 58 slides along the lower edge of arm 52 it will reach the recess 59a substantially in the position of FIG. 5. By action of spring 55, catch 58 will then pass below recess 59a and member 50 now being free of arm 52 will rapidly return in the direction of the arrow FIG. 5 to the position of FIG. 4. As the operator releases pressure on lever 40 spring 54 will return it to the "rest" position of FIG. 4.

To prevent lever 40 and member 50 from prematurely returning to the "rest" position, the upper edge of arm 52 has a plurality of serrations 60 for ratchet like coaction with a pawl 61, the latter pivotally mounted on member 50 by pawl pivot 62. A pawl stop 63 is disposed within an indented area 64 of the pawl to limit the latter's pivotal movement. The pawl being secured to member 50 moves with the latter as it travels from the position shown in FIG. 4 to that shown in FIG. 5. During such travel the pawl will be in contact with lever serrations 60 to act as a ratchet preventing the lever and member 50 from returning to the position of FIG. 4. Once catch 58 passes beneath recess 59a member 50 is free of arm 52 and begins to travel in the direction of the arrow of FIG. 5. At this point pawl 61 will be drawn away from serrations 60 and can no longer stop the return movement of member 50 and lever 40.

To limit the movement of lever 40 within resected section 14 two outwardly facing stops 65 and 66 are integrally formed with plate 50 adjacent to the limits of section 14. Likewise the movement of arcuate member 50 is limited by a pair of stops 67 and 68, the former contacting the leading edge to prevent spring 54 from moving the member past the position shown in FIG. 4. Stop 68 prevents clockwise movement of member 50 beyond the position shown in FIG. 5.

The upper end of member 50 comprises an outwardly facing actuation lug 69 for actuating the date wheel 18. When in the "rest" position of FIG. 4 lug 69 is positioned adjacent to case wall 11. Similarly the lower end of member 50 carries a counterweight holding lug 70 to retain and set counterweight means so that upon actuation, wheel 18 will always indicate the next successive date as will now be explained.

Figure 8:
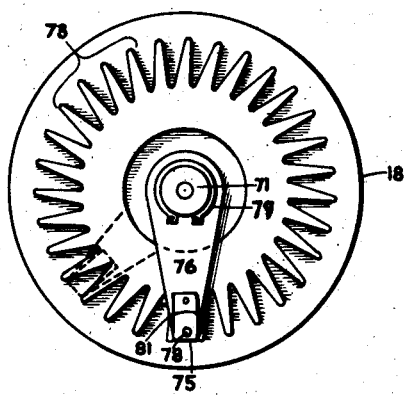
FIG. 8 is a rear view of the date wheel.

Date wheel 18 is mounted for rotation on the cylindrical portion of shaft 22 by means of date wheel bearing 71. The leading edge of the bearing consists of a hub 72 which complementarily fits into the rear surface of flanged bearing 28. As shown in FIG. 8, the rear face of wheel 18 has a series of thirty-one radially disposed date wheel blades 73. Each blade extends radially out from the center area of the wheel terminating in spaced relation from its periphery. The front surface of the wheel has a series of peripherally disposed date indicia 74 extending from the number 1 to 31. The terminal edge of each of the blades 73 is respectively spaced directly behind each one of the indicia 74. By examining the indicia shown in FIG. 1 it can be seen that every fourth number represents a consecutive number or date, i.e., numeral 1 is followed by 9, 17 and 25 before the consecutive number 2 appears. Number 3 appears four indicia spaces in a counterclockwise direction from number 2. All numbers appear in this sequence.

The rear surface of wheel 18 also comprises a small metal counterweight 75 which is resiliently held in place by a thin metallic counterweight retainer 76. The latter is secured to bearing 71 by means of a wheel knurl 77. The end of the counterweight has a rounded pin 78 (FIG. 7) which contacts blades 68 and the spaces therebetween. Pin 78, together with resilient retainer 76 allows the counterweight to be easily moved over the exposed surface of the blades. A cylindrical magnet 79 for the purpose of attracting counterweight 76 is disposed in the lower portion of case 10 and is secured within a magnetic housing 80 integrally formed with the case.

To actuate date wheel 18, the operator moves lever 40 down thus moving member 50 in a clockwise direction and along with it lug 69. On actuation the arcuate shape of member 50 provides a curved trajection (shown by the arrows in FIG. 4) to the path of the movement of lug 69 so that the lug moves into the peripheral area of blades 73 contacting one of them to move the wheel clockwise until the member 50 is the position of FIG. 5. The clockwise movement of lug 69 against any one of blades 73 is such that it moves the wheel clockwise a distance equivalent to the space between four blades 73. As soon as the blade reaches the position of FIG. 5 catch 58 passes under recess 59a by the action of spring 55. The member 50 is then returned to the position of FIG. 4. While moving to this position lug 69 again contacts one of the blades 73 to move the wheel in an opposite or counterclockwise direction. Since the action of spring 55 moves member 50 along with lug 69 in rapid motion, wheel 18 is rotated counterclockwise with considerable velocity. As lug 69 nears the "rest" position of FIG. 4 it moves out past the peripheral ends of blades 73 allowing the wheel 18 to rotate freely on shaft 22.

By referring to FIGS. 4, 5 and 8 it will be seen that as the date lug 69 moves through its cycle the counterweight holding lug 70 will move from the solid line position of FIG. 4 to that of FIG. 5. The arcuate shape of member 50 is such that it allows considerably less travel by lug 70 than that of lug 69. As lever 40 is first brought into motion, counterweight holding lug 70 will first move into the dotted line position of FIG. 4. Lug 70 is thus moved in from the periphery of wheel 17. At this point it will contact the leading edge 81 of counterweight 75 to keep the weight from traveling along between blades 73 in clockwise direction when viewed from the position of FIG. 8. Lug 70 thus holds counterweight 75 substantially stationary at the bottom of wheel 18 as the latter is moved clockwise by the action of lug 69. Rounded pin 78 and the resiliency of counterweight retainer 76 allows blades 73 to pass freely in front of the counterweight. The weight remains in contact with and "skips" over blades 73.

As explained above, upon actuation of lever 40 lug 69 moves wheel 18 in a clockwise direction a distance equal to the space between four of the blades 73. This is also the same distance between consecutive numbers of indicia 74. Simultaneously lug 70 holds counterweight 75 in a stationary position so that four of blades 73 will pass in front of the counterweight during actuation from the position of FIG. 4 to that of FIG. 5. During such movement counterweight 75 will always be held in a fixed position as shown by the solid lines of FIG. 8. As wheel 18 revolves clockwise a distance of four blades the counterweight will be placed in the dotted line position of FIG. 8 with relation to blades 73 but will remain parallel with relation to the vertical axis of case 10. As wheel 18 traverses this clockwise distance, the next consecutive date indicia will appear momentarily under indicator 13. In such position the date indicia is diametrically opposite the position of counterweight 75. The date wheel 18 is then revolved by the return action of lug 69.

As the wheel's velocity decreases the weight of the counterweight 75 together with the attraction of cylindrical magnet 79 to the weight will bring the wheel to rest so that counterweight 75 is always adjacent magnet 79. Since counterweight 75 has been placed by the clockwise movement diametrically opposite the next consecutive number or date, such date will now appear directly under indicator 13 at the top of case 10.

In order to set wheel 18 reset lever 46 is moved downward by the operator. This moves lugs 48 into contact with each side of the counterweight holding it in a stationary position while wheel 18 is manually rotated until the correct date appears under indicator 13.

*Operation*

The operator manually moves date wheel 18 until the correct date appears under indicator 13. During this movement reset lever 46 is pushed down so that lugs 48 contact each side of counterweight 75 holding the latter in vertical position adjacent cylindrical magnet 79.

The day indicator disc 17 is then manually rotated until the chosen day appears through indicating frame 20. As the wheel is turned detent spring 35 holds pellet 32 resiliently against the annulus 30 in which recesses 31 are located. As the disc turns, pellet 32 is forced into one of the recesses tending to hold disc 17 in this position. Rotation however is continued until the selected day appears in frame 20. The pellet at that point will be fitted in a corresponding recess 31 so that the correct date will be in register with frame 20. The device is now set for day to day operation.

By way of example only, consider the calendar to be manually "set" for Sunday, the first of the month. The day indicia "Sun" will appear in frame 20 and the numerical indicia 74 will show the numeral 1 under indicator 13. When it is desired to change the calendar to the following date (Monday the 2nd) the operator moves lever 40 down to the position shown in FIG. 5. This action moves lug 69 into the periphery of blades 73 to move the wheel 18 clockwise a distance of four numerals incorporated in indicia 74. The next consecutive indicia, numeral "2," will momentarily be brought substantially under indicator 13. Lug 70 will hold counterweight 75 stationary so it is now in a position diametrically opposite the numeral "2." Catch 58 will then slide beneath recess 59a and lug 69 will actuate wheel 18 in a rapid counterclockwise direction. The wheel will spin until the weight and attraction of counterweight 75 to magnet 79 stops the wheel. Since counterweight 75 is now adjacent magnet 79 the numeral "2," diametrically opposite thereto, will appear directly under indicator 13.

Simultaneously with the above action, arm 41 will actuate a corresponding rotor 43 to rotate disc 17 clockwise a distance sufficient to bring the next day indicia, "Mon" into view in frame 20. Pellet 32 will fit into the recess radially aligned with "Mon" to insure registry with frame 20. The device is now ready upon further actuation of lever 40 to bring the next successive day (Tue the 3rd) into registry with frame 20 and indicator 13.

Since there are 31 dates incorporated in indicia 74, an adjustment of wheel 18 will be necessary to bring numeral "1" under the indicator 13 when months with less than 31 days have passed. Other than this adjustment, the calendar will operate automatically by the simple operation of lever 40 once each day.

It is to be understood that specific embodiments described above are given by way of example only and that this invention is to be construed in accordance with the appended claims.

What is claimed:
1. A perpetual calendar having a case; an indicator secured at the top thereof and an indicating frame spaced in vertical alignment below said indicator; a day disc mounted forward of the case having a plurality of day indicia thereon and rotatable to bring any one of the day indicia into and out of registry with said indicating frame; a date wheel mounted between the day disc and case having a series of numerical indicia along the periphery thereof, consecutive numerical indicia being positioned thereon in a spaced relation from each other, a selected one of the consecutive numerical indicia positioned at the top of the wheel in registery with said indicator; a counter weight resiliently disposed in a first position on the rear surface of the bottom of said wheel diametrically opposite the selected one of the indicia in registry with said indicator; an arcuate member pivotally disposed within said case for partial movement clockwise and counterclockwise; first lug means disposed at the upper end of said arcuate member for striking the rear surface of said date wheel and rotating the same clockwise a distance equivalent to the space between consecutive numerical indicia and for moving said date wheel counter clockwise to provide free rotation to the same; second lug means disposed at the lower end of said arcuate member to secure said counter weight in stationary position as said first lug means rotates said date wheel clockwise the space between consecutive numerical indicia, whereby said counter weight is moved to a second position diametrically opposite the next consecutive numerical indicia in relation to the selected one of the indicia; and magnetic means at the bottom of the case for attracting the counter weight and stopping the same diametrically opposite the next consecutive numerical indicia on said wheel.

2. A perpetual calendar comprising in combination a case; an indicator at the top of the case; an indicating frame disposed in vertical alignment below said indicator; a day disc with indicia along the periphery thereof corresponding to each of the days of the week, the disc disposed forward of said case and rotatable through intermittent stop means, the stop means disposed in radial alignment with each of the indicia and said indicating frame; a rotatable date wheel disposed between the disc and case having numerical date indicia positioned along its periphery, each of the indicia representing one of the dates of a thirty-one day month, consecutive date indicia spaced apart from each other a distance equivalent to the space occupied by three of such date indicia; a counter weight movable along the periphery of the lower portion of the rear surface of said wheel; a resiliently mounted pivotal member seated within the case and rearward of the date wheel having first means thereon to partially rotate the wheel during pivotal movement of the member a distance substantially equivalent to the space occupied by four of the numerical indicia and then provide full rotation to said wheel and second means thereon to hold said counter weight stationary during the partial rotation of said wheel; means within the case immediately rearward the lower portion of said wheel to attract said counter weight and stop rotation of said wheel with the counter weight adjacent thereto; and a single lever to simultaneously contact said disc for intermittent rotation and pivot said resiliently mounted pivotal member.

3. A perpetual calendar comprising a case; a day indicating disc mounted for intermittent rotation forward of said case; a date wheel for indicating monthly dates mounted for free rotation between said case and day disc; a counterweight movably secured to the rear surface of said date wheel for stopping rotation thereof by providing counterbalance action on same; pivotal means within said case for first imparting a partial rotation to said date wheel in a first direction while simultaneously securing said counterweight in a fixed position relative to the vertical axis of said case and secondly for imparting free rotation to said date wheel and the counterweight in a second direction; and lever means for simultaneously actuating said day disc and pivotal means.

4. A perpetual calendar comprising a case; a date wheel and a day disc mounted for rotation forward of said case; day indicia disposed along the periphery of said day disc; an annular member secured to the front of said day disc for rotation therewith and having a plurality of recesses disposed circumferentially thereon in radial alignment with said day indicia; a pellet for intermittent seating in any one of said recesses; a retaining member disposed in fixed position forward of said day disc having means therein to resiliently position said pellet in alignment with the circumferential pathway of said recesses disposed in said retaining member and to seat said pellet in said recesses as the same are brought one at a time into registry with said pellet upon rotation of said day disc, the seating of said pellet in said recesses tending to stop rotation of said date disc; and a lever for simultaneously rotating said date wheel and day disc.

5. A perpetual calendar comprising in combination; a case; a first and second indicator; a day disc having indicia printed thereon corresponding to the seven days of the week; a rotating date wheel adjacent said day disc having numerical indicia printed thereon; stop means having a movable member secured to the rear surface of said date wheel for rotation therewith and a stationary member secured to said case; an arcuate actuating member disposed rearward of said date wheel to first position the movable member of said stop means diametrically opposite a selected one of the numerical indicia and then rotating said date wheel, the stationary member of said stop means co-operating with the movable member thereof to stop rotation of said date wheel when the selected one of the numerical indicia is in registry with said first indicator; and a lever for providing rotation to said day disc to bring any one of the indicia thereon out of and into registry with said second indicator and simultaneously engaging said arcuate actuating member.

References Cited in the file of this patent

UNITED STATES PATENTS

| 786,181 | Ballantyne | Mar. 28, 1905 |
| 1,989,593 | Girosi | Jan. 29, 1935 |
| 2,246,883 | Harrison | June 24, 1941 |
| 2,719,718 | Rothgery | Oct. 4, 1955 |

FOREIGN PATENTS

| 1,017,053 | France | Sept. 10, 1952 |